United States Patent

[11] 3,592,120

| [72] | Inventor | Carlos Cudell Goetz<br>Avenida Luiz Bivar 36-50 Esq, Lisbon, Portugal |
|---|---|---|
| [21] | Appl. No. | 749,626 |
| [22] | Filed | Aug. 2, 1968 |
| [45] | Patented | July 13, 1971 |
| [32] | Priority | Aug. 16, 1967 |
| [33] | | Portugal |
| [31] | | 48206 |

[54] PROCESS OF PRESSURIZATION OF AIRCRAFT, WITH DIFFERENT PRESSURE VALUES IN ITS VARIOUS COMPARTMENTS
4 Claims, 1 Drawing Fig.

[52] U.S. Cl. .................................................. 98/1.5,
62/239, 220/10, 244/117
[51] Int. Cl. ...................................................... B64d 13/04
[50] Field of Search .......................................... 98/1.5;
244/117, 117.1, 118, 118 P, 1 SS; 62/405, 239A;
114/16, 16.3; 220/9 C, 10

[56] References Cited
UNITED STATES PATENTS

| 2,755,638 | 6/1956 | Sevin | 62/239 A |
|---|---|---|---|
| 2,819,590 | 1/1958 | Green | 98/1.5 |
| 2,923,222 | 2/1960 | Manning | 98/1.5 |

*Primary Examiner*—Meyer Perlin
*Attorney*—Steinberg and Blake

ABSTRACT: A method for controlling the interior pressure of an aircraft. The aircraft has at least one intermediate space situated between the interior cabin space of the aircraft and the exterior of the aircraft. A pressure which is substantially different from the outside pressure is maintained within the interior cabin space while there is simultaneously maintained in the intermediate space a pressure between the pressure in the interior cabin space and the outside pressure. In this way the transition from the inside to the outside pressure is more gradually distributed, thus making it possible for pressurized fuselage structures to be used at altitudes and pressure higher than would normally be expected.

PATENTED JUL 13 1971 3,592,120
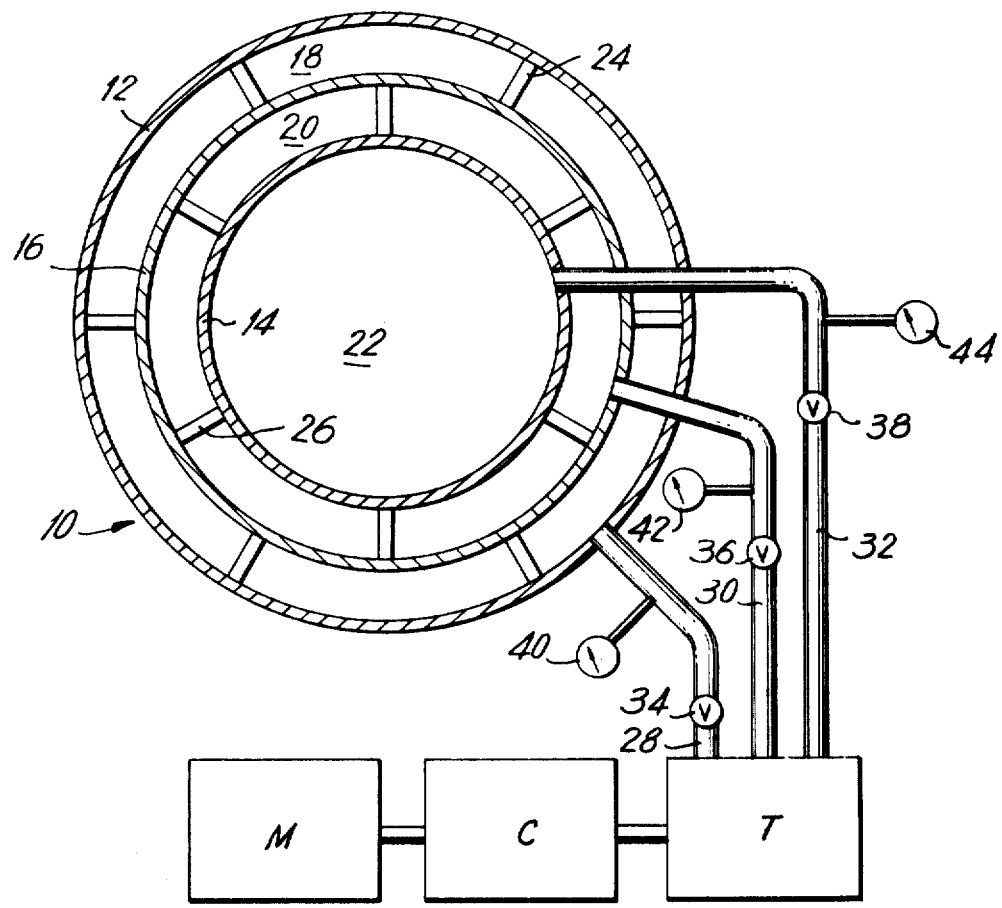
INVENTOR.
CARLOS CUDELL GOETZ
BY
Steinberg and Blake
ATTORNEYS

PROCESS OF PRESSURIZATION OF AIRCRAFT, WITH DIFFERENT PRESSURE VALUES IN ITS VARIOUS COMPARTMENTS

The present invention relates to flying machines. Known flying machines at the present time suffer from grave fault in that they affect human health and may even kill. Very slowly, scarcely noticed, it unbalances the metabolism, even on very short trips. In some cases, although rare, it can cause sudden death.

We do not refer to the so-called catastrophes. These, in any case, common to all transportation means, are very less frequent in the air. In effect, the aircraft is today one of the safest means of travelling and with great possibilities of further improvement. The statistics are conclusive.

In this specification, however, we will put in relief certain aspects which, generally speaking, are totally ignored by the public and which nevertheless can cause great inconvenience to their health and even prove fatal.

We refer in the first place to the cabin in which the passengers travel.

Even in the most modern and luxurious aircraft this is far from being the most adequate to human well-being and is very different from that normally found in other means of transportation and this chiefly due to the effect of the rarefied atmosphere and the synthetic climate within the cabins of present aircraft. This factor detrimentally affects the human metabolism.

Unfortunately, it is not only this factor which prejudices the metabolism, because there are other factors also, such as the great speed at which, within a few hours, various time zones are transposed, as well as the quick changes from one climate to another quite often totally different, which accumulate effects so harmful to the health.

There is even the circumstance that when these three factors compound, the pernicious effects of them are multiplied not three times, but n times in an accentuated logarithmic manner; all this is further aggravated by the results of noise and vibration, which are so woeful to some individuals.

Evidently, only long-range passengers suffer from the speedy passage through various time zones and the rapid dislocation from one climate to a much different one. In the Portuguese Pat. of Invention No. 42,467 of May 3, 1965, we already indicated viable solutions against these two inconveniences.

However, the ones that result from the cabin atmosphere are perhaps the gravest of all harms which affect those using air transportation; they strike the long-range passengers as well as even those who make only short trips, small as they may be.

It takes only 1 hour to transpose a distance of 1,000 kilometers (about 600 miles); however, after arrival one is in inferior physical and psychic conditions to make convenient use of the remainder of the day (or night). It will take time to normalize the disturbed metabolism. While it is true that there are people who do not feel any change and who appear upon arrival, with just the same good disposition they had on departure, it happens also that with some persons the symptoms show only after several hours, or even days.

Even with those, who do not notice the change, the harmful affects exist. It may only be temporarily and the normalization will vary from person to person; it can be more prolonged or can be permanent, or even fatal. If this already happens after only one single and short trip, it becomes more evident with those who frequently use air transportation; gradually the effects accumulate and one day they will manifest themselves suddenly and in the most unexpected manner. It has not been proven, so far, that the human body adapts itself easily to abnormal circumstances of low atmospheric pressure; particularly to abrupt changes from normal pressure to lower ones, and vice versa. There are always some ills, latent in the human body, which probably never would surface, because natural biological defenses prevent it, but when the metabolism is convulsed abruptly, the body can become so weakened that the protective barriers will fail.

The objective of this invention is to solve these problems in a simple and efficient manner, reducing the effects of the difference existing between the pressure inside the cabin of an aircraft and the outside atmospheric pressure, and providing even for the possibility inside the cabins, at any flying altitude, of a pressure equivalent to sea level, or zero-meter altitude.

What happens at present inside the aircraft? At takeoff, especially with modern jetcraft, one climbs very rapidly from the level of an airport to a flight altitude, on short trips, of about 8,000 meters (about 26,500 feet) or up to about 12,000 (about 40,000 feet) during medium or long haul.

As these altitudes cannot be supported by the human body, the air pressure inside the cabin is regulated to correspond approximately to an altitude between 1,000 to 2,500 meters (3,300 to 8,250 feet). For example, flying at 8,000 meters (26,500 feet), inside the passenger cabin an air pressure corresponding to an altitude of approximately 1,000 meters (3,300 feet) is created whereas flying at 12,000 meters (40,000 feet) the value of the pressure will correspond approximately to an altitude of 2,500 meters (8,250 feet).

Any person projected, within a few minutes, from sea level to an altitude between 1,000 and 2,500 meters (3,300 to 8,250 feet) would notice a strong disturbance in his well-being. Inside the aircraft, generally, the passenger does not feel it, because he is comfortably installed in a good and well-cushioned seat and ignores the progressive rarefying of the air. The metabolism, however, resents it, whether the passenger notices it or not. This is the cause of a variety of illnesses which might reveal themselves some time after the trip: nervous, cardeological, pulmonary, etc. etc. etc.

To this adds increasingly the excessive speed of climb and descent, with sudden passages from one pressure to another, aggravating physiologically the ill feeling. Medicine, pills, injections, before and after the trips, can reduce the effects; however, the only entirely satisfactory solution would be to establish inside the cabin an air pressure equivalent to the atmospheric pressure of the takeoff place, and preferably to change gradually during flight the cabin pressure from the equivalent of the outside pressure at takeoff to the atmospheric pressure at place of arrival.

The harmful effects, nevertheless, would already become attenuated if for example the cabin air pressure would be increased to correspond to about 500 to 1,000 meters (1,650 to 3,300 feet), instead of 1,000 to 2,500 meters (3,300 to 8,250 feet), as happens at present.

At first sight this seems very simple; it would be sufficient to increase the pressure of the cabin up to this value, but this would involve the need of reinforcing heavily the structure of the fuselage, to enable it to support such great a difference of pressure between the interior and the exterior. Much more resistant materials would be required, resulting in higher initial cost of the craft and higher weight empty ("dead weight"); all this would jeopardize the economy and revenue possibilities of the respective aircraft.

More serious still would be the technical problems resulting from such a solution: the greater difference between the outside atmospheric pressure and the pressure in the interior of the fuselage would more easily provoke, in case of holes or cracks in the wall of the fuselage, small as they may be, the so dreaded "explosive decompression." It is evident that the bigger the difference between the inside pressure and that of the outside, the greater the peril that this decompression occurs.

If this is so, we have to put aside this simple solution of direct reinforcement of the fuselage and, therefore, we disclose, constituting the objective of the present invention, a novel solution which consists essentially in "scaling" the difference between the outside air pressure acting upon the fuselage of an aircraft flying in altitude, and the air pressure inside the space of the same craft, creating a perfectly healthy cabin for passengers and crews.

In its essence the solution consists in the realization of an aircraft with two (or more) fuselages, encircling one the other (or the others), with intermediate space or zones to separate each fuselage from the other, such intermediate space to be full of air, the pressure of which can be modified in conformity with the atmospheric pressure of the flight altitude and the intensity of air pressure which one desires to maintain for the interior space of the aircraft.

By this process one can obtain that the air pressure acting from the inside on the wall of the exterior fuselage, will be smaller than that to which it is being subjected at present and at the same time one can have in the cabin interior a higher air pressure than existing at present, in identical conditions of flight altitude.

The same effect can be obtained for the cargo compartments.

This process to solve the problem of air pressure differences between the exterior and the interior of present aircraft permits, besides a more gradual "scaling" of these differences, other notable advantages, amongst which the following merit to be mentioned:

a. Greater safety because a perforation or crack in the exterior fuselage will not involve the immediate perils of explosive decompression.

b. Reduction or elimination of noise and vibration which at present affect passengers and crews.

c. A possibility of using, in the intermediate space or zones, an inert gas between the two fuselages, with the objective of reducing fire hazard.

d. Possibility of establishing, by making use of the air or gas enclosed in the aforementioned intermediate zones, a shock-absorbing system in cases of accidents during takeoff or landing.

e. Possibility of using more flexible materials in the walls of the interior fuselage, the shape of which can be different from the rigidity imposed for aerodynamical reasons on the exterior fuselage.

With this invention it becomes possible, at any flying altitude, to create inside the cabins for passengers and pilots and even for the cargo compartments, an air pressure most convenient for the human habitat or for the conservation of cargo being transported; it will be easy to equalize the cabin pressure to the atmospheric pressure level of the departure airport and gradually modify it in flight to the pressure of the level of the arrival airport, if wanted; one can purify the interior atmosphere of the cabins by "dosing" the most convenient proportions of the elements which compose this atmosphere and regulate, simultaneously, its degree of humidity and temperature, in order to provide for passengers and crew to travel in an "ambient" of perfect salubrity, without the least prejudicial influence on their metabolism. Thus the travelers will arrive perfectly rested and relaxed at their destination and even benefited from their having stayed in an atmosphere to which ingredients can be added with proven advantages for the human health.

In this way the passenger will really relax during the voyage and can attend to his affairs immediately upon arrival, without any need for some prior rest, as happens today.

From their side the crews will feel much less the efforts spent during the voyage, which is of accentuated importance for the hostesses who biologically are most affected in present aircraft.

The separation of the interior fuselage from the exterior fuselage by means of air or an inert gas will certainly open large possibilities in order to soundproof totally, or almost so, the interior of the aircraft and at the same time also to eliminate all vibrations.

The elasticity which can be given to the complex of the interior fuselage can further contribute to a greater protection in flight against accidents, in cases of violent and sudden atmospheric turbulence, thereby attenuating the circumstances to which passengers are nowadays exposed; accidents caused by being thrown against rigid walls of present cabins.

It is, indeed, a totally new system of shock absorbing and elimination of noise and vibration which this solution provides.

Such a system of a chamber of air, or gas, between the exterior fuselage and the interior, constitutes also one more possible means of more efficient testing the airtightness of the fuselage, as well as to verify fatigue or ageing of materials, by means of alternate tests, some with higher air pressure and others with lower than the outside atmospheric pressure.

In case of indications, during flight, of loss of air, either in the cabins or in the intermediate zones, it will be possible to quickly verify it in the pressure control system and there will be more time available than happens today, to permit the pilot to descend to an altitude where the perils of explosive decompression no longer exist.

Referring to these perils of instantaneous decompression, spontaneous or explosive, the new system offers a considerable increase in safety because due to the fact of the existence of one or more intermediate zones, the air pressure which actuates upon the fuselage wall (or on the wall at the cabins or on the walls between intermediate zones) will always be less than the difference of pressures actuating upon the fuselage from the inside and from the outside, if there were no intermediate zone or zones.

In attached table we present various examples. It is shown that at a flight altitude of 5,000 meters and with cabin air pressure value corresponding to 1,000 meters altitude, the differential pressure actuating upon the wall of the fuselage is equivalent to 4,000 meters which is what happens at present. However, if between the cabin and the fuselage, a separate zone will be installed and maintaining inside the cabin the same pressure equivalent to 1,000 meters and in this intermediate zone an air pressure corresponding to 3,000 meters, the difference of pressures actuating upon the fuselage is only the equivalent of 2,000 meters (and the same happens with the difference of pressures actuating upon the divisory between cabin and intermediate zone) so that the difference of pressures (and it is this what counts for the effect of resistance against decompression) is only one-half of what is would be without intermediate zone, or one-half or the difference of pressures existing in present aircraft. If we go further and establish in the interior of the cabin an air pressure value equal to sea level, or zero meters, one obtains at the same flight altitude of 5,000 meters, in the intermediate zone a pressure corresponding to altitude of 2,500 meters, which means that the differences of pressures between the exterior and the interior of the main fuselage is the equivalent of 2,500 meters (and the same happens between cabin and divisory wall with the intermediate zone). It thus results that even maintaining cabin air pressure corresponding to sea level (the most convenient, normally, for human health), one obtains nevertheless a much smaller differential of pressures than with present systems in existing aircraft.

Example No. 2 shows that at altitude of 12,000 meters and maintaining air pressure inside the cabin corresponding to altitude of 2,500 meters (as happens in present aircraft and which is very prejudicial to human health), the difference of pressures actuating upon the fuselage between the exterior and the interior is equivalent to 9,500 meters, which constitutes evident peril in view of inherent possibilities of instantaneous decompression. If, however, the air pressure inside the cabin is reduced to the equivalent of 1,000 meters (which would be already less unbearable to the human well-being), in this case the difference between the exterior and the interior would increase to the equivalent of 11,000 meters, inadmissible from the point of view of safety. However with an intermediate separate compartment, the difference would descend to the the equivalent of only 5,500 meters and if, in this case of a flight altitude of 12,000 meters, we would go even further and maintain inside the cabins an air pressure corresponding to sea level, or zero meters, we will be able to maintain in the intermediate zone a pressure equivalent to 6,000 meters and the differences of pressure between the exterior and the interior actuating upon the wall of the fuselage would be reduced to the equivalent of 6,000 meters. Still more flagrant are examples 3 and 4, with two separate intermediate zones following each other. We verify that even flying at the maximum altitude of 12,000 meters and with a corresponding to zero meters inside the cabins, or a pressure corresponding to sea level, the difference of pressures actuating upon the cover of the fuselage is the equivalent of only 4,000 meters, or the same pressure which actuates on aircraft presently existing when cruising at only 5,000 meters flight altitude and with 1,000 of air pressure inside the cabins.

These intermediate zones, the main purpose of which is a gradual distribution of the air pressure between the cabins and the wall of exterior fuselage, can have a very reduced width, just sufficient to permit unobstructed passage of the air and that its pressure can be regulated at will; all that is necessary is to have appropriate action of the air pressure upon the interior surface of the wall of the exterior fuselage, as well as upon the exterior surface of the walls of the cabins and, if there is more than one intermediate zone, also upon the surfaces of the respective walls of these intermediate zones.

When above we refer to the possible enrichment of the air inside the cabins with ingredients beneficial to the well-being and the human health, it is evident that in a similar way the air of the cargo compartments can be enriched in order to better protect and conserve the respective cargos in conformity with their nature. It is evident that also in this case the temperature and the degree of humidity in the air can be regulated at will.

A few words have to be added about means to install the interior fuselage (or fuselages) inside the exterior fuselage. Evidently, the interior fuselage needs connecting with the exterior fuselage and such connection can be realized by known conventional means, as for instance to have at several points structural pieces which connect the outside wall of the interior fuselage with the inside wall of the exterior fuselage. These structural elements shall be constructed in such a manner that they will allow free circulation of the air, or inert gas, which is in this zone between the interior fuselage and the exterior fuselage. The structural connecting elements can be of any known conventional materials and can have, advantageously, a certain elasticity compatible with the purpose in view. They can also be of cellular construction allowing free circulation of the air, or inert gas, throughout the cells. During the constructive evolution of these systems, the most adequate connection means will be found; at this moment the inventor limits himself to point out to the necessity, which is obvious, to have these structural connecting elements, but does not enter into constructive details, besides mentioning the possibility that these very connecting elements can also have absorbing qualities of vibration and of noise.

Finally there exists the possibility to simplify considerably the proposed system; that is by maintaining constant pressure, at any flight altitude, in the intermediate zone or if more than one, in the intermediate zones. As an example we indicate in the case of one single intermediate zone, a constant pressure equivalent to 5,000 meters of altitude, but evidently one can also opt for any other pressure. Thus the aircraft on takeoff would have in this intermediate zone a pressure equivalent to 5,000 meters of altitude, although in the exterior the atmospheric pressure would be that of the level of the airport. In the passengers cabin and in that of the pilots the pressure would be equivalent to the atmospheric pressure of the departure airport. When the aircraft reaches a flight altitude of 5,000 meters, in the intermediate zone the pressure continues at the equivalent of an altitude of 5,000 meters, but in the cabins of the passengers and of the pilots the pressure continues to be the equivalent of the atmospheric pressure of the departure airport, or already graduated to approach the atmospheric pressure of the arrival airport. When the aircraft reaches flight altitudes superior to 5,000 meters, in the intermediate zone the pressure continues to be the equivalent of 5,000 meters, even when the aircraft reaches ceiling altitude, which is about 12,500 meters with present aircraft, whereas in the passenger cabin and that of the pilots the pressure continues to be equivalent to the pressure of the departure airport, or already graduated to approach the atmospheric pressure of the arrival airport.

In the same order of ideas, if there are two intermediate zones, for the zone actuating upon the interior surface of the wall of the exterior fuselage one can take a pressure equivalent to an altitude of 5,000 meters and in the intermediate zone adjacent to the passengers cabin and that of the pilots a pressure equivalent to 2,500 meters of altitude; also in these cases, evidently, one can choose any other desired pressure.

It is our opinion that thus simplifying the whole system, the results will be nevertheless just as satisfactory. To a certain extent there might be even some advantages, as, for instance, the actuating pressures upon the fuselage walls will not always be from the same direction, as presently is the case, but will alternate some times from one side and on other occasions from the other side, which may result, eventually, in less fatigue of the materials employed for the fuselages.

An example of the invention is indicated schematically in the accompanying drawing where there is a schematic transverse section of the fuselage of an aircraft with the drawing also illustrating schematically the manner in which the various pressures are achieved and maintained.

Thus, referring to the drawing, it will be seen that the fuselage 10 illustrated includes an outer fuselage shell 12 and an inner fuselage shell 14, with an intermediate fuselage shell 16 situated between the inner and outer shells. Of course, the inner shell 14 defines the interior cabin of the aircraft where the passengers and crew are located. The exterior atmosphere is engaged by the exterior surface of the outer shell 12. These fuselage shells define between themselves airtight chambers 18 and 20. The interior of the cabin 14 forms a third chamber 22. The several shells are maintained spaced from each other by any suitable structures such as the spacer components 24 between the shells 12 and 16 and the spacer components 26 between the shells 16 and 14. Although the several shells may be made of substantially rigid material they also may be made of flexible materials, as long as the latter materials are airtight so that different pressures may be maintained in the several chambers 18, 20, and 22.

In order to achieve the maintenance of different pressures in the different chambers a motor M is provided to drive a compressor C which delivers compressed air to a tank T. This motor M may be the engine of the aircraft, for example. The compressor C and tank T may be units which are in any event present on any suitable aircraft.

In the illustrated example the tank T communicates through conduits 28, 30, and 32 with the chambers 18, 20, and 22, respectively. These air conduits are provided with control valves 34, 36, 38, respectively, which may be automatically or manually controlled so as to provide at the several chambers pressures which may be read at the gauges 40, 42, and 44. Of course, these pressure gauges will be situated at a location where they can easily be consulted.

Thus, with the arrangement schematically shown in the drawing it is possible to provide for high-altitude flying a pressure in the chamber 18 which is greater than the outside pressure but which is less than the pressure in the chamber 20, and in turn the pressure in the chamber 20 while greater than the pressure in the chamber 18 is less than the pressure in the chamber 22. The pressure in the chamber 22 may closely approach atmospheric pressure, so that through this pressure gradient achieved by dividing the differentials through the several chambers it is possible to give the fuselage shells relatively simple structures which do not require them to withstand very large stresses. Suitable altitude responsive devices may be operatively connected through several motors, cams, or the like, to the valves 34, 36, and 38, so as to actuate these valves in response to altitude changes so as to maintain the pressure in the cabin 22 substantially constant at approximately atmospheric pressure while varying the pressures in the chambers 18 and 20 in a fully automatic manner to provide for one-third of the difference between the outside pressure and that in the chamber 22 at the chamber 18 and for the other third of the difference between the outside and the interior of the cabin in the chamber 20.

| Flight altitude (meters) | Air pressure in the cabins (corresponding to altitude meters) | Air pressure in the intermediate compartment (corresponding to altitude meters) | | Differences of pressure actuating upon the fuselage wall (corresponding to altitude meters) |
|---|---|---|---|---|
| EXAMPLE 1 | | | | |
| 5,000 | 1,000 | (¹) | | 4,000 |
| 5,000 | 1,000 | 3,000 | | 2,000 |
| 5,000 | 0 | 2,500 | | 2,500 |
| EXAMPLE 2 | | | | |
| 12,000 | 2,500 | (¹) | | 9,500 |
| 12,000 | 1,000 | 6,500 | | 5,500 |
| 12,000 | 0 | 6,000 | | 6,000 |
| EXAMPLE 3.—TWO INTERMEDIATE COMPARTMENTS | | First | Second | |
| 5,000 | 1,000 | 2,333 | 3,666 | 1,333 |
| 5,000 | 0 | 1,666 | 3,332 | 1,666 |
| EXAMPLE 4.—TWO INTERMEDIATE COMPARTMENTS | | | | |
| 12,000 | 1,000 | 4,666 | 8,332 | 3,666 |
| 12,000 | 0 | 4,000 | 8,000 | 4,000 |

¹ Without intermediate compartment (present planes).

What I claim is:

1. In a method for controlling the interior pressure of an aircraft having an interior cabin space and a fuselage with one intermediate space surrounding the interior cabin space and situated between the latter and the outer atmosphere, the steps of maintaining approximately sea level atmospheric pressure in the interior cabin space of the aircraft at altitudes substantially higher than 20,000 feet and including an altitude in the range of 40,000 feet, so that the approximately sea level atmospheric pressure is substantially different from the outside pressure, while simultaneously maintaining in the intermediate space a pressure which is midway between the approximately sea level atmospheric pressure in the interior space and the outside pressure.

2. In a method as recited in claim 1 and wherein the pressures are regulated in accordance with altitude changes to maintain the pressure in the interior space substantially constant during altitude changes.

3. In a method for controlling the interior pressure of an aircraft, the steps of maintaining in the interior cabin space of an aircraft which has at least one intermediate space between the interior space and the exterior of the aircraft, a pressure which is substantially different from the outside pressure while simultaneously maintaining in the intermediate space a pressure which is between the pressure in the interior space and the outside pressure, there being a plurality of spaces one surrounding the other and situated between the interior space and the outside, the steps of maintaining in each of the plurality of intermediate spaces different pressures which provide a gradual series of differential pressures progressing from the pressure in the interior space to that at the outside of the aircraft.

4. In a method as recited in claim 3 and wherein the pressures are regulated in accordance with altitude changes to maintain the pressure in the interior space substantially constant during altitude changes.